United States Patent
Moon

(10) Patent No.: US 7,342,898 B2
(45) Date of Patent: Mar. 11, 2008

(54) SYSTEM AND METHOD FOR DETERMINING TRANSMISSION POWER IN A PACKET DATA TRANSMISSION SYSTEM

(75) Inventor: Hyung Cheol Moon, Kyungki-Do (KR)

(73) Assignee: LG Electronics Inc., Seoul (KR)

( * ) Notice: Subject to any disclaimer, the term of this patent is extended or adjusted under 35 U.S.C. 154(b) by 881 days.

(21) Appl. No.: 10/025,879

(22) Filed: Dec. 26, 2001

(65) Prior Publication Data

US 2002/0085513 A1 Jul. 4, 2002

(30) Foreign Application Priority Data

Dec. 28, 2000 (KR) ............... 2000-84441

(51) Int. Cl.
*H04B 7/185* (2006.01)
(52) U.S. Cl. ............... 370/318; 370/328; 455/522
(58) Field of Classification Search ........... 370/328, 370/329, 332, 322, 320, 318, 342, 349, 447, 370/461, 347, 445, 441, 345, 352, 449, 401, 370/334–335, 316, 311; 455/422.1–460, 455/67.11, 522, 450, 69, 13.4, 500, 515, 63.1, 455/63, 67.6, 453, 67.16, 70, 349, 62, 337, 455/132, 503, 410, 411, 414, 422, 424–430, 455/517, 67.1, 428, 12.1, 13.1, 13.2; 375/130, 375/140
See application file for complete search history.

(56) References Cited

U.S. PATENT DOCUMENTS

| | | | |
|---|---|---|---|
| 6,058,307 A * | 5/2000 | Garner | 455/428 |
| 6,243,580 B1 * | 6/2001 | Garner | 455/428 |
| 6,259,724 B1 * | 7/2001 | Esmailzadeh | 375/143 |
| 6,498,785 B1 * | 12/2002 | Derryberry et al. | 370/311 |
| 6,542,739 B1 * | 4/2003 | Garner | 455/427 |
| 6,628,956 B2 * | 9/2003 | Bark et al. | 455/522 |
| 2002/0077138 A1 * | 6/2002 | Bark et al. | 455/522 |

FOREIGN PATENT DOCUMENTS

CN  1171663  1/1998

OTHER PUBLICATIONS

Chinese Office Action (Jun. 10, 2005).

* cited by examiner

*Primary Examiner*—Doris H. To
*Assistant Examiner*—Christopher Grey
(74) *Attorney, Agent, or Firm*—Ked & Associates, LLP

(57) ABSTRACT

Disclosed is a system and method for determining a transmission power in a radio packet data transmission system on the basis of the transmission power at the previous packet transmission. A preferred method includes: a step for calculating the transmission power; a step for transmitting a Preamble to the base station with the calculated transmission power; a step for receiving a channel occupying signal from the base station as a response to the preamble; and a step for transmitting packet data after the channel occupying signal is transmitted and ending the packet data transmission process if the transmission is successfully made. The system and method advantageously reduce the amount of time required to transmit subsequent packets of data at more optimal power levels.

20 Claims, 7 Drawing Sheets

SYSTEM AND METHOD FOR DETERMINING TRANSMISSION POWER IN A PACKET DATA TRANSMISSION SYSTEM

BACKGROUND OF THE INVENTION

1. Field of the Invention

The present invention relates to a packet data transmission, and particularly, to a system and method for determining transmission power of packet data.

2. Background of the Related Art

A mobile communication system using radio packet data transmission at high speed is a system for providing communication service between mobile stations such as a potable terminal or a car phone, or between a mobile station and a telephone subscribed in a PSTN (Public Switched Telephone Network).

Generally, a radio communication network such as the mobile communication system uses a circuit method and a packet method in order to provide a data service.

The circuit method is a method which allocates needed resources and channels to a transmission node which will transmit data, and the allocated channel is a dedicated circuit for the duration of the call. By contrast, the packet method is a method excluding monopolies on the channel, where a channel is allocated to a corresponding transmission node only when there is data to be transmitted. In a packet method, the allocated channel is released when the data transmission is completed, and thereby the other transmission mode can transmit data.

FIG. 1 is a block diagram showing a related art mobile communication network including multiple mobile stations 10 and a base station 20.

FIG. 2 is a flow chart showing a related art circuit switched data transmission process. As shown, the data transmission process of a circuit method includes setting a call between a transmission node and a receive node (S1) and allocating resources such as time slot, a trunk, and a memory device after the call is set (S2). The process further includes transmitting data through the allocated resources and channel (S3) and releasing the allocated resources when the data transmission is completed (S4, S5).

In the data transmission system of a circuit method, a call should be set between the transmission node and the receiver node before the data is transmitted. In addition, resources such as the time slot, the trunk, and the memory device, which are needed for data transmission, are allocated by the system when the call is set.

When the call setting is completed and a channel is allocated, the corresponding call occupies the allocated channel until the data transmission is completed. When the data transmission is completed, the system releases the resources allocated for the data transmission.

As described above, the circuit method uses all bandwidth provided by the system, and a large amount of data can be transmitted. However, only about 5% of the connection time is used for the data transmission, and therefore the utility of the channel and the number of calls which can be accepted is small.

As described above, the circuit method is not suitable to provide high through-put communications, and therefore the packet method has been developed for IMT-2000 (International Mobile Telecommunications 2000) service.

FIG. 3 is a flow chart showing a related art packet switched data transmission process. As shown therein, the data transmission of a packet method includes identifying whether or not there is transmission data in the transmission node (S11) and allocating a channel if there is transmission data in the transmission node (S12). The method further includes transmitting the data after the channel is allocated (S13) and releasing the allocated channel when the data transmission is completed (S14, S15).

Data transmission by the packet method occupies the channel only when data is included in a respective transmission node, and therefore more transmission nodes can transmit data and the utility of the channel can be increased.

FIG. 4 is a signal diagram showing signals in the data transmission process of a packet method suggested by the 3GPP ($3^{rd}$ Generation Partnership Project) the asynchronous part of IMT-200, and FIG. 5 is a conceptual view according to that same method.

CPCH (Common Packet Channel) suggested by the 3GPP is a method in which a channel is set before data transmission and the data is transmitted when the channel is set, similar to the circuit method. It is different from the circuit method in that the channel is allocated only when there is data to be transmitted on the transmission node.

As shown in FIG. 4, the CPCH data transmission of the 3GPP method includes transmitting an AP (Access Preamble) from a mobile station 10 to a base station 20 (S21) and transmitting an AP-AICH (Access Preamble-Acquisition Indication Channel-acknowledge) signal from the base station 20 to the mobile station 10 as a response to the AP signal (S22). The method further includes transmitting a CD (Collision Detection) Preamble from the mobile station 10, which received the response, to the base station 20 (S23) and transmitting a CD-AICH (Collision Detection-Acquisition Indication Channel-acknowledge) signal from the base station 20 to the mobile station 10 as a response signal to the CD preamble signal (S24). Finally, the method includes transmitting information data and control data from the mobile station 10 to the base station 20 (S25).

Referring to both FIGS. 4 and 5, the mobile station 10 transmits an AP at position P0 with a lowest level of transmission power set by the system in step S21. If the base station 20 does not receive the AP transmitted from the mobile station 10 on position P0, the base station 20 can not be synchronized and can not generate a response signal AP-AICH. Therefore, the mobile station 10 again transmits the AP at position P1 after a prescribed period of time is passed, with a transmission power which is increased at a prescribed level greater than that of the AP transmitted from the position P0 in step S21.

When the base station 20 receives the AP, the base station 20 indicates that the signal is synchronized by transmitting an AP-AICH signal to the mobile station 10 as a response in step S22, and then the mobile station 10 transmits a CD-preamble to the base station 20 in step S23. In addition, the base station 20 transmits a CD-AICH signal to the mobile stations 10 as a response to the CD-preamble signal in step S24. The CD-preamble signal is for preventing impacts when more than one mobile station 10 requests allocation of the same channel at the same time.

The mobile station 10 prepares for the data transmission by passing through steps S21, S22, S23, and S24. The mobile station 10 then transmits information data and control data through a PCPCH(UL) (Physical Common Packet Channel(Up Link)) to the base station 20 in step S25. In addition, the base station 20 regularly transmits signals for power control, pilot, and CPCH control to the mobile station 10 through a DPCCH(DL) (Dedicated Physical Control Channel(Down Link)).

The method of the related art has many problems. For example, in the case of the packet method suggested by 3GPP, a plurality of AP's are transmitted for the respective packets, and the first AP is transmitted with the lowest level of transmission power set by the system for minimizing interruption to the other channels. Thus, accessing the base station takes a long time using this method, since the AP is transmitted with initial transmission power which has fixed level, and the accessing process is performed each time a packet is transmitted. The disadvantageous delays associated with initial transmission power adjusting times, t, are illustrated in FIG. 6. Accordingly, high speed data transmission is difficult.

The above references are incorporated by reference herein where appropriate for appropriate teachings of additional or alternative details, features and/or technical background.

SUMMARY OF THE INVENTION

An object of the invention is to solve at least the above problems and/or disadvantages and to provide at least the advantages described hereinafter.

Another object of the present invention is to provide a method for determining a transmission power in a radio packet data transmission system.

Another object of the present invention is to reduce an access time of a mobile station to a base station.

In order to achieve at least the above objects in whole or in part and in accordance with the purposes the invention, as embodied and broadly described herein, there is provided a method for determining transmission power of a first station in a wireless packet data communication system, including calculating a transmission power in the first station based on a previous data transmission, transmitting a preliminary signal with the calculated transmission power from the first station to a second station, and transmitting packet data from the first station to the second station, if the preliminary signal is acknowledged by the second station.

To further achieve at least the above objects in whole or in part and in accordance with the purposes the invention, as embodied and broadly described herein, there is provided a method for determining a transmission power of a first station in a wireless transmission system, including calculating a transmission power in the first station based on a previous data transmission, transmitting a preamble from the first station to a second station with the calculated transmission power, receiving a channel occupying signal from the second station as a response to the preamble, and transmitting packet data from the first station to the second station after the channel occupying signal is received, and ending the packet data transmission when the transmission is successfully received by the second station.

To further achieve at least the above objects in whole or in part and in accordance with the purposes the invention, as embodied and broadly described herein, there is provided a wireless packet data communication system, including a mobile terminal configured to transmit packet data to a second station at a calculated transmission power, wherein the calculated transmission power is determined in accordance with at least one of a previous transmission power of the mobile terminal and control information received by the mobile terminal, and a base station coupled to communicate with the first station and configured to transmit the control information to the mobile terminal.

To further achieve at least the above objects in whole or in part and in accordance with the purposes the invention, as embodied and broadly described herein, there is provided a mobile communication terminal, including means for calculating a transmission power based on a previous data transmission, means for transmitting a preliminary signal using the calculated transmission power, means for transmitting packet data if an acknowledgment to the preliminary signal is received, and means for ending the packet data transmission when the packet data transmission is successfully received by the second station.

Additional advantages, objects, and features of the invention will be set forth in part in the description which follows and in part will become apparent to those having ordinary skill in the art upon examination of the following or may be learned from practice of the invention. The objects and advantages of the invention may be realized and attained as particularly pointed out in the appended claims.

BRIEF DESCRIPTION OF THE DRAWINGS

The invention will be described in detail with reference to the following drawings in which like reference numerals refer to like elements wherein.

DETAILED DESCRIPTION OF PREFERRED EMBODIMENTS

Reference will now be made in detail to the preferred embodiments of the present invention, examples of which are illustrated in the accompanying drawings.

Figure 1:
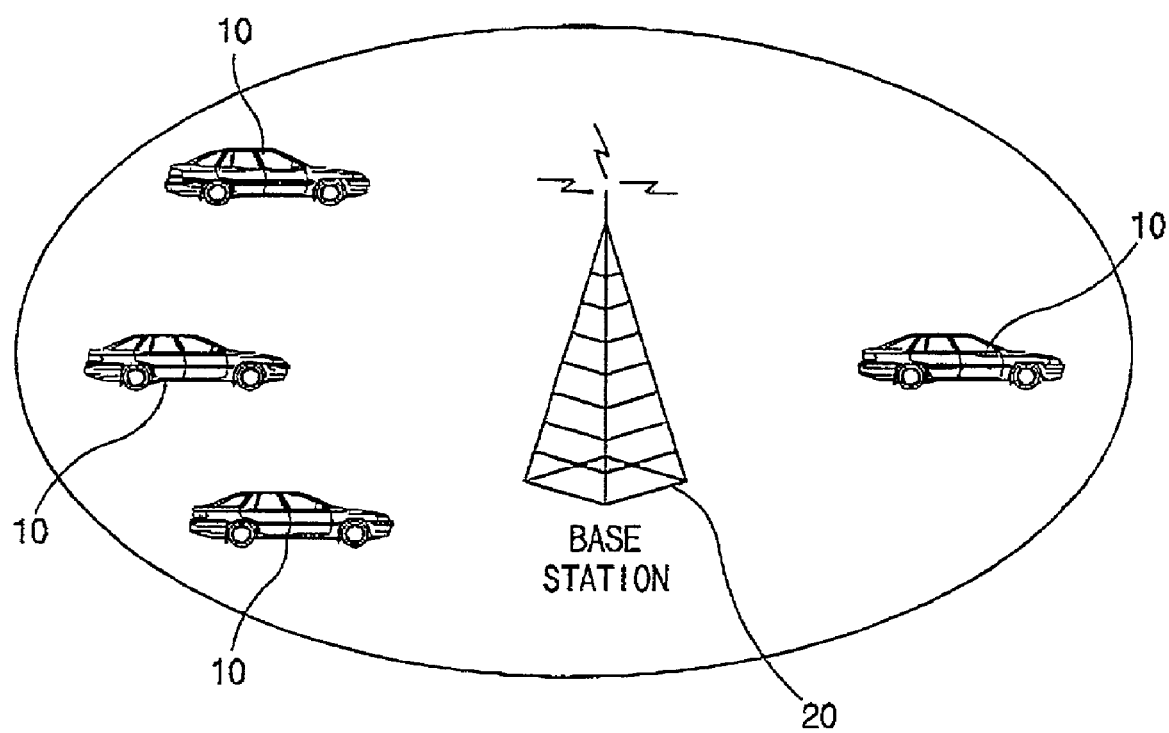
FIG. 1 is a diagram showing a related art mobile communication network.
Figure 2:
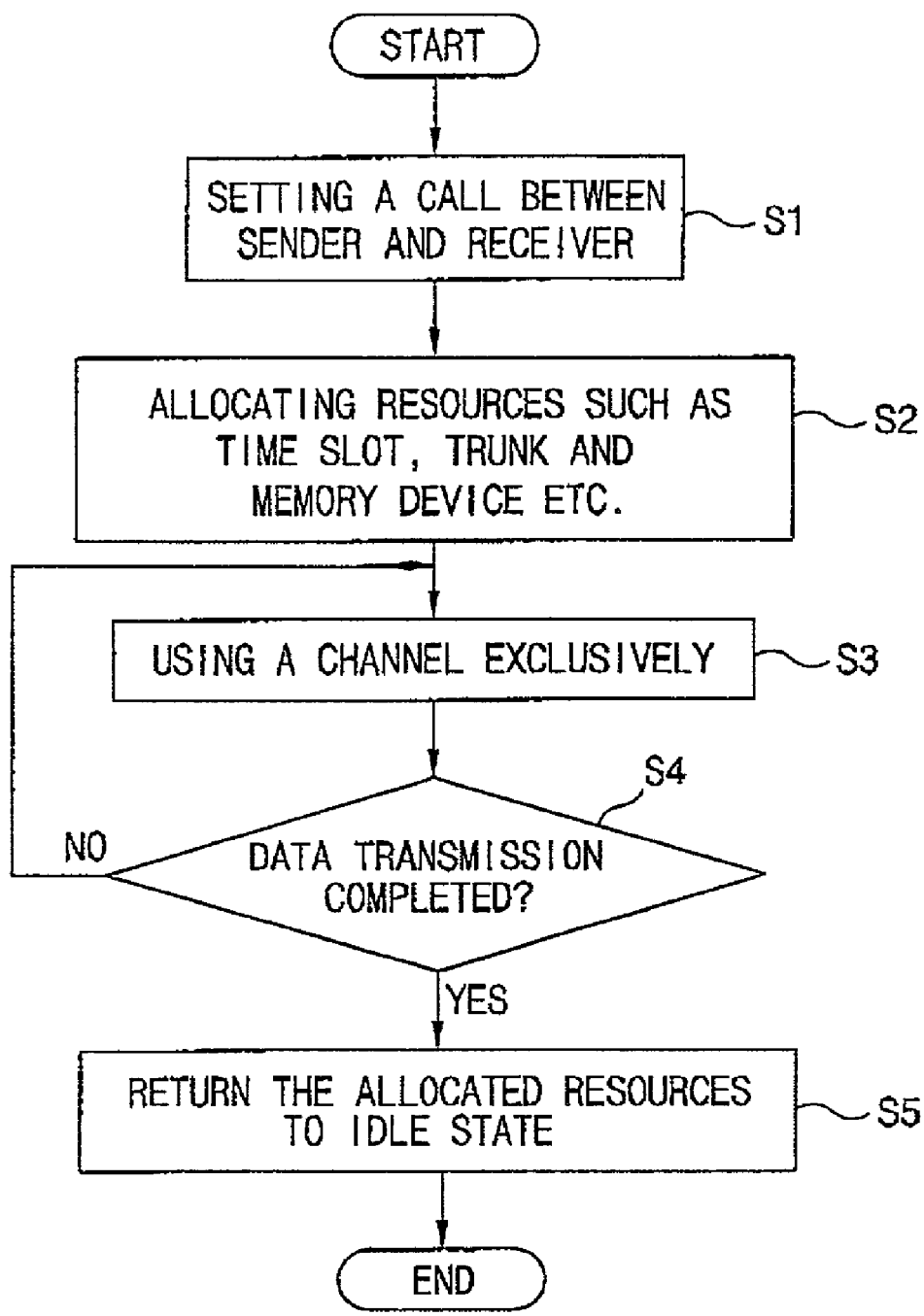
FIG. 2 is a flow chart showing a related art data transmission process according to a general circuit method.
Figure 3:
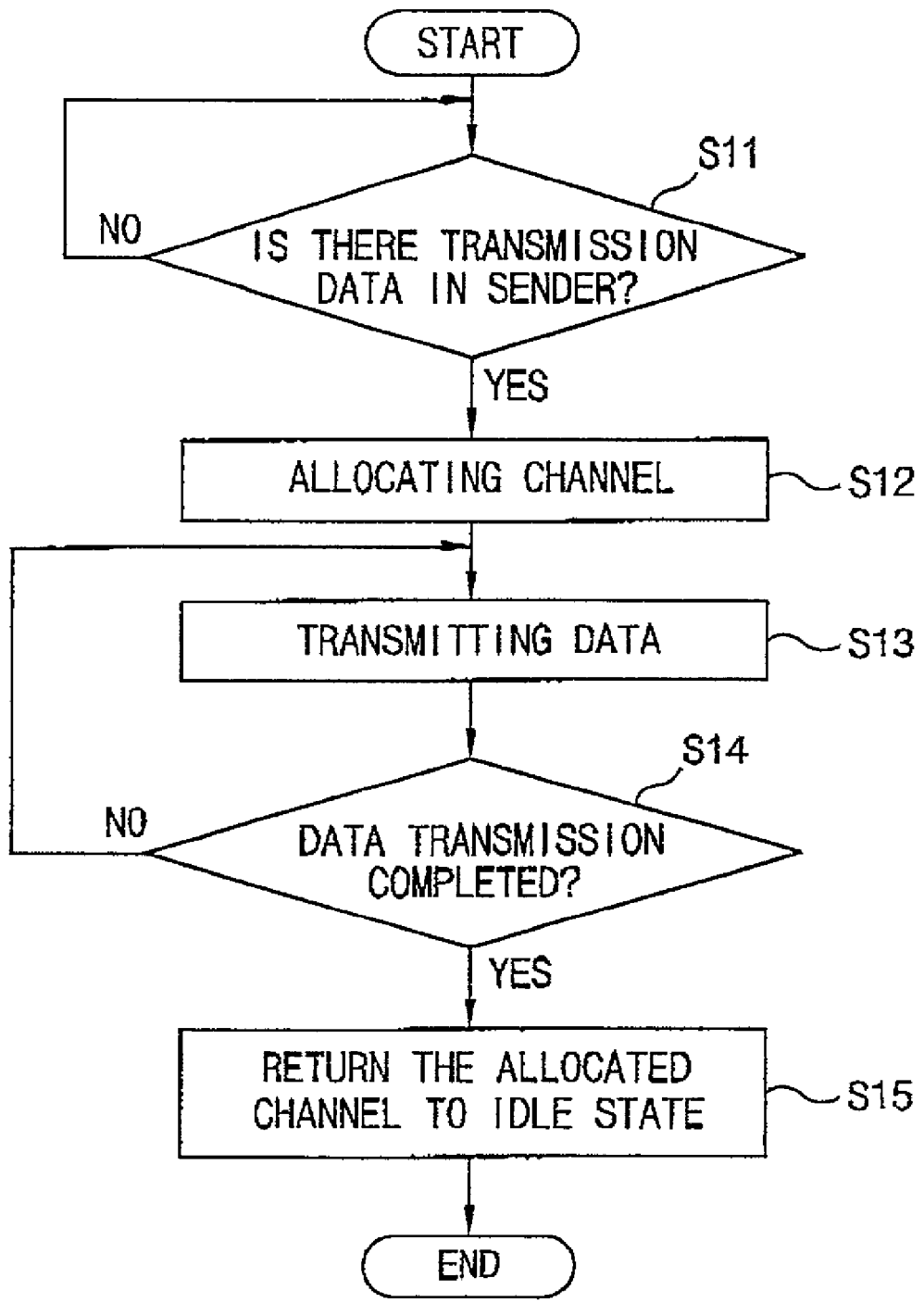
FIG. 3 is a flow chart showing a related art data transmission process according to a general packet method.
Figure 4:
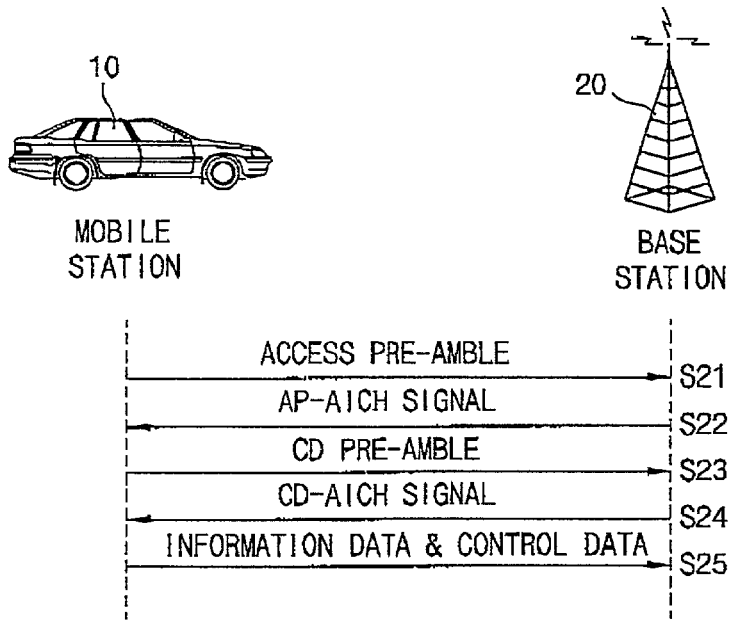
FIG. 4 is a signal diagram in a data transmission process according to a 3GPP method.
Figure 5:
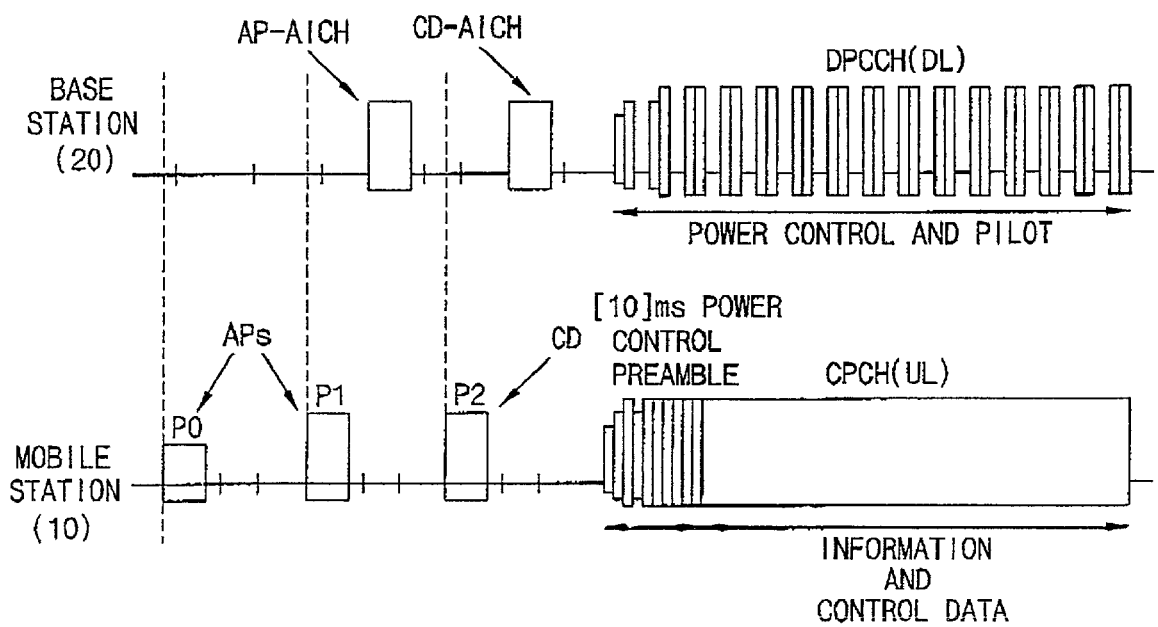
FIG. 5 is a diagram of a data transmission according to the 3GPP method.
Figure 6:
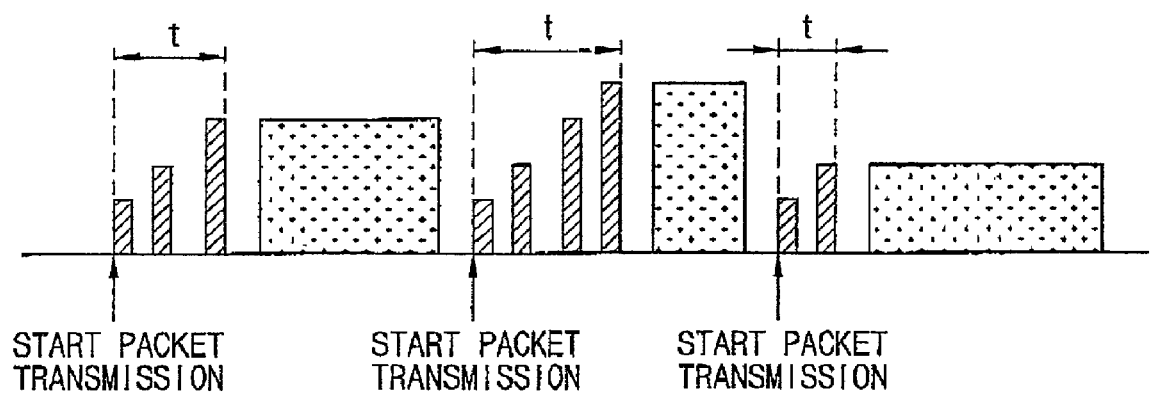
FIG. 6 is a diagram of an initial transmission power determining process according to the 3GPP method.
Figure 7:
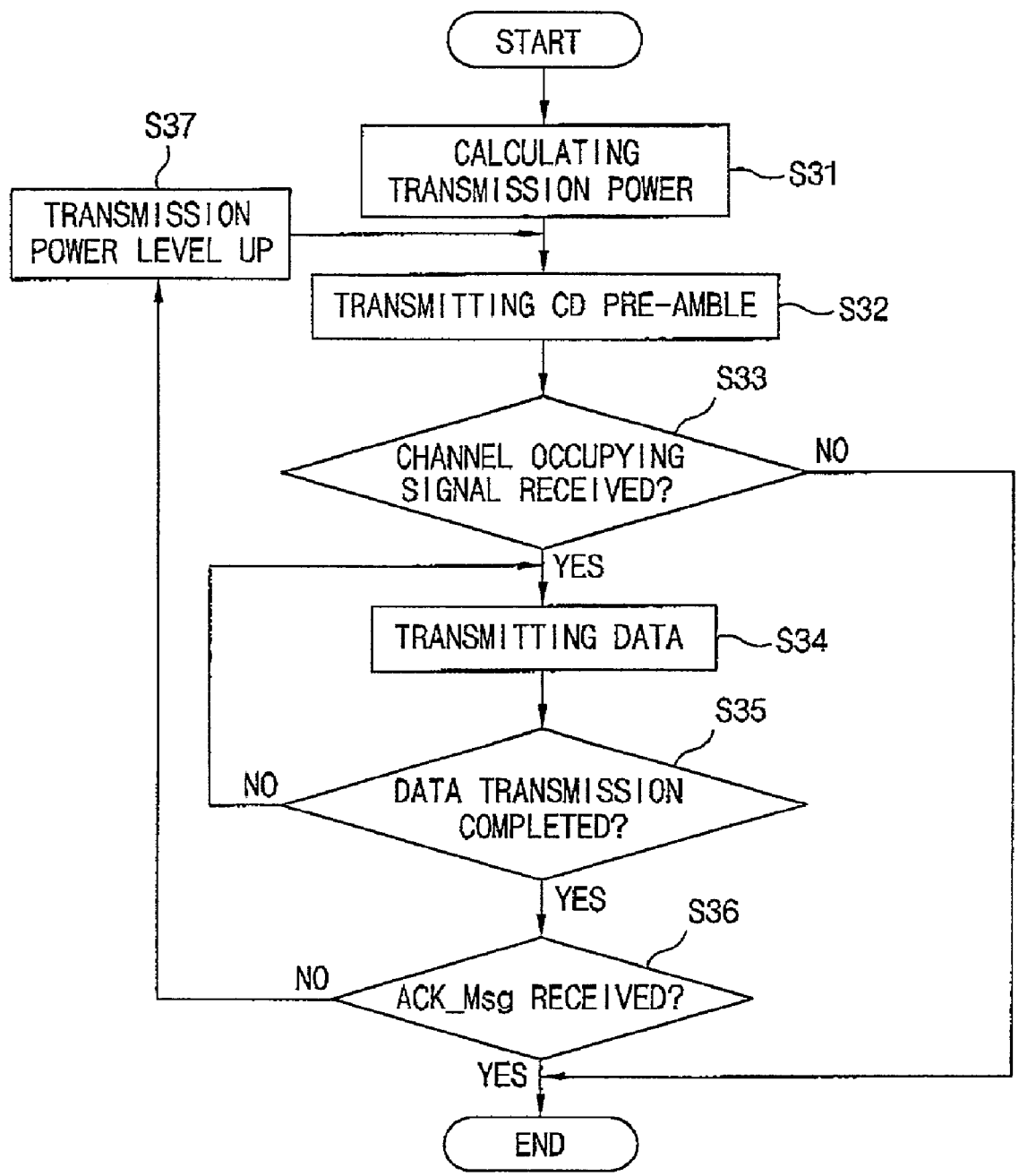
FIG. 7 is a flow chart showing a method for determining an initial transmission power according to a preferred embodiment of the invention.

FIG. 7 is a flow chart showing a process for determining a transmission power after a first packet has been sent, according to a preferred embodiment of the invention. As shown therein, a method for determining the transmission power according to the present invention preferably includes calculating a transmission power (S31); transmitting a CD Preamble with the calculated transmission power (S32), and identifying whether or not a channel occupying signal, for example a CD-AICH signal, is transmitted from a base station 20 as a response to the CD Preamble (S33). The method preferably further includes transmitting packet data if the channel occupying signal is transmitted from the base station (S34) and identifying a result of the packet data transmission (S35, S36).

If the channel occupying signal is not transmitted from the base station 20 in step S33, the process may be ended. If the data transmission fails in step S36, then the transmission power is increased (S37), and steps S32, S33, S34, S35, and S36 may be repeated.

The transmission power of a second or subsequent packet may be determined by the transmission power of a previous data transmission; a changed amount of the transmission power of the mobile station 10 perceived by the base station 20 during previous data transmission; differences between the previous transmission power and the present transmission power of the base station 20 as measured by the mobile station 10; and by a channel compensating value of the base station 20 controlling the strength of the transmission power of the mobile station 10 so as to be in proportion to the number of channels which are allocated.

The mobile station 10 preferably determines the transmission power when a signal is transmitted to base station 20 in step S31. If the strength of the initial transmission power is too low, base station 20 cannot perceive the transmitted signal of mobile station 10. On the other hand, if the strength of the transmission power is too high, the signal of the corresponding mobile station channel may interrupt a signal of another channel. Therefore, it is advantageous to calculate an appropriate transmission power.

Also, it is advantageous to calculate the transmission power as soon as possible so as to reduce accessing time. Where the calculation time is excessive each time respective packets are transmitted, high-speed data transmission may not be possible.

The following expression may be used for determining the transmission power of a mobile station 10 for a second or subsequent packet according to a preferred embodiment of the invention.

Initial transmission power–transmission power of a first or previous packet transmission+controlled amount of the transmission power by the base station+changed amount of received power+channel compensating value of the base station.

The base station 20 preferably measures and calculates the transmission power of a previous packet of mobile station 10 during a first or prior data transmission. In addition, after data is transmitted, the base station 20 preferably transits a value corresponding to the controlled amount of the transmission power via a control signal to the mobile station 10.

The changed amount of received power is the difference between the power of the signal transmitted from the base station 20 at previous packet transmission, and the power of the signal transmitted from the base station 20 at a next packet transmission, as measured by the mobile station 10.

When the number of channels which are used is increased because of active call connections of mobile stations 10, interference between the channels may also increase. In addition, in order to prevent the interference between the channels, the base station 20 may increase the transmission power of mobile station 10. The amount of the increased electric power by the base station 20 is preferably the channel compensating value.

As described above, the mobile station 10 preferably transmits the CD preamble with the calculated transmission power in step S32, and waits for a channel occupying signal. The base station 20 which received the preamble may then generate a channel occupying signal by allocating a channel in step S33. However, if there is no channel to be allocated to mobile station 10, or if the transmission power is too weak to perceive the CD preamble, the base station 20 does not generate the channel occupying signal in step S33. When the mobile station 10 does not receive the channel occupying signal, the mobile station 10 preferably turns off the electric power and ends the packet data transmission process.

When the base station 20 transmits the channel occupying signal to the mobile station 10, the mobile station 10 preferably transmits the data in step S34 and S35. In response, the base station 20 preferably transmits an ACK_Msg to the mobile station 10 to acknowledge receipt of the data. The ACK_Msg preferably includes an amended value of the transmission power, and the amended value may be an electric power controlling value which maintains the transmission power of the mobile station 10 by measuring the transmission power transmitted from the mobile station 10 to the base station 20.

If the mobile station 10 does not receive the ACK_Msg in step S36, the mobile station 10 may determine that there is an error on the data transmitted by the mobile station 10 or that the transmission power is weak, and preferably increases the transmission power in step S37 and proceeds according to steps S32, S33, S34, S35, and S36.

Figure 8:
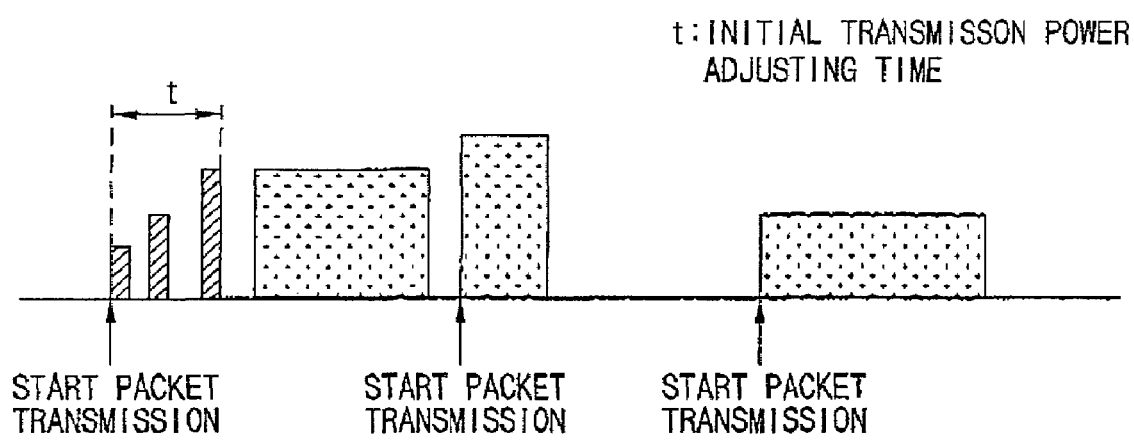
FIG. 8 is a diagram of a process for determining the initial transmission power according to a preferred embodiment of the invention.

FIG. 8 is a simulation view showing a determining process of the transmission power of a second or subsequent packet according to a preferred embodiment of the invention. As shown therein, the transmission power is preferably determined based on the transmission power used on a first or previous packet data transmission according to the present invention.

The preferred embodiment of the present invention has many advantages. For example, once the call connection is made, the connection to the base station 20 can be made for subsequent packet transmissions faster than the method suggested by 3GPP. Power adjustment delays associated with the first packet transmission are similar to the method of 3GPP, however, net packet transmissions are faster than with the 3GPP method. Thus, transmitting time for subsequent packets is reduced, and data transmission speed can be increased.

In an alternative embodiment a base station may adjust transmission power to a mobile station, instead of the mobile station adjusting power to a base station. In yet another embodiment, a mobile station may adjust transmission power to another mobile station. In still another embodiment, a fixed station may adjust transmission power to another fixed station.

The foregoing embodiments and advantages are merely exemplary and are not to be construed as limiting the present invention. The present teaching can be readily applied to other types of apparatuses. The description of the present invention is intended to be illustrative, and not to limit the scope of the claims. Many alternatives, modifications, and variations will be apparent to those skilled in the art. In the claims, means-plus-function clauses are intended to cover the structures described herein as performing the recited function and not only structural equivalents but also equivalent structures.

What is claimed is:

1. A method for determining transmission power of a first station in a wireless packet data communication system, comprising:

transmitting a preliminary signal with a first transmission power from the first station to a second station;

transmitting a first packet data from the first station to the second station with the first transmission power;

increasing the transmission power of the first station to an increased second transmission power if the first packet data transmission is not successfully received by the second station, wherein the increased second transmission power is calculated based on the first transmission power used by the first station in the first packet data transmission to the second station, a controlled amount of transmission power of the first station as perceived by the second station during a previous packet data transmission, a changed amount of power of the second station received at the first station during a previous packet data transmission, and a channel compensating value received from the second station corresponding to a number of allocated channels as determined by the second station; and transmitting a second packet data from the first station to the second station with the increased second transmission power.

2. The method of claim 1, further comprising ending the packet data transmission when the packet data transmission is successfully received by the second station.

3. The method of claim 1, wherein transmitting the preliminary signal comprises:
    transmitting a preamble from the first station to the second station; and
    receiving a channel occupying signal from the second station as a response to the preamble.

4. The method of claim 3, further comprising ending the packet data transmission process if the channel occupying signal is not received from the second station.

5. The method of claim 1, wherein the second transmission power is calculated by summing the first transmission power used in the first packet data transmission, the controlled amount of the transmission power of the first station as perceived by the second station, the changed amount of power of the second station received at the first station during the previous packet data transmission, and the channel compensating value received from the second station.

6. The method of claim 1, wherein the first station is a mobile communication station and the second station is a base station.

7. The method of claim 1, wherein the increased second transmission power is calculated based on the channel compensating value received from the second station.

8. The method of claim 1, wherein the preliminary signal comprises a collision detect (CD) signal.

9. The method of claim 1, wherein the channel occupying signal comprises a CD-ACH signal.

10. A method for determining a transmission power of a first station in a wireless transmission system, comprising:
    transmitting a preamble from the first station to a second station with a first transmission power;
    receiving a channel occupying signal from the second station as a response to the preamble; and
    transmitting first packet data from the first station to the second station after the channel occupying signal is received,
    increasing the transmission power of the first station to an increased second transmission power if the first packet data transmission is not successfully received by the second station, wherein the second transmission power is calculated based on the first transmission power used by the first station, a controlled amount of transmission power of the first station as received by the second station during a previous packet data transmission, a changed amount of power of the second station as received by the first station during a previous packet data transmission, and a channel compensating value received from the second station;
    transmitting a second packet data from the first station to the second station with the increased second transmission power; and
    ending the packet data transmission when the transmission is successfully received by the second station.

11. The method of claim 10, further comprising ending the packet data transmission if the channel occupying signal is not received from the second station.

12. The method of claim 10, wherein the second transmission power is calculated by summing the controlled amount of the transmission power of the first station as received by the second station, the changed amount of power of the second station as received by the first station, and the channel compensating value received from the second station.

13. The method of claim 10, wherein the first station is a mobile terminal and the second station is a base station.

14. The method of claim 10, wherein the channel occupying signal comprises a CD-ACH signal.

15. A wireless packet data communication system, comprising:
    a mobile terminal configured to transmit packet data to a base station at a first transmission power and to increase the transmission power to a second transmission power when the packet data is not successfully received by another entity, wherein the second transmission power is calculated by summing a previous transmission power of the mobile terminal, a controlled amount of transmission power of the mobile terminal as determined by the base station during a previous packet data transmission, a changed amount of power of the base station as received at the mobile terminal during a previous packet data transmission, and a channel compensating value received from the base station and being based on a number of allocated channels; and
    the base station coupled to communicate with the mobile terminal and configured to transmit control information to the mobile terminal.

16. The system of claim 15, wherein the control information is transmitted from the base station to the mobile terminal together with an acknowledgment message related to a previous data transmission from the mobile terminal.

17. The system of claim 15, wherein the mobile terminal is further configured to transmit a preliminary signal to the base station at the first transmission power prior to transmitting the packet data.

18. A mobile communication terminal, comprising:
    means for transmitting a preliminary signal at a first transmission power;
    means for transmitting a first packet data if an acknowledgment to the preliminary signal is received;
    means for increasing the transmission power of the packet data transmission to an increased transmission power if the first packet data transmission is not successfully received by a second station, wherein the means for increasing calculates the increased transmission power based on a transmission power used by the mobile communication terminal in a previous transmission to the second station, a controlled amount of transmission power of the mobile communication terminal as received by the second station during a previous packet data transmission, a changed amount of power of the second station as received at the mobile communication terminal during a previous packet data transmission, and a channel compensating value received from the second station;
    means for transmitting a second packet data at the increased transmission power; and
    means for ending the packet data transmission when the packet data transmission is successfully received by the second station.

19. The terminal of claim 18, wherein the acknowledgment comprises control information sent from a base station.

20. The terminal of claim 19, wherein the mobile terminal is configured to transmit to a base station, and wherein the base station comprises:
    means for receiving the preliminary signal from the mobile terminal;
    means for transmitting a channel occupying signal in response to the preliminary signal;
    means for receiving packet data transmitted from the mobile terminal; and
    means for transmitting an acknowledgment signal to the mobile terminal when the data transmission from the mobile terminal has been received.

* * * * *